United States Patent
Benco et al.

(10) Patent No.: US 7,415,456 B2
(45) Date of Patent: Aug. 19, 2008

(54) NETWORK SUPPORT FOR CALLER IDENTIFICATION BASED ON BIOMETRIC MEASUREMENT

(75) Inventors: David S. Benco, Winfield, IL (US);
Kevin J. Overend, Elmhurst, IL (US);
Baoling S. Sheen, Naperville, IL (US);
Sandra Lynn True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 586 days.

(21) Appl. No.: 10/697,577

(22) Filed: Oct. 30, 2003

(65) Prior Publication Data

US 2005/0097131 A1 May 5, 2005

(51) Int. Cl.
*G06F 7/00* (2006.01)
*G06F 17/30* (2006.01)
(52) U.S. Cl. .................. 707/3; 707/1; 707/6; 707/9; 707/10; 379/88.2; 455/415; 382/127
(58) Field of Classification Search .................. 707/1, 707/3, 6, 9, 10; 379/88.17, 88.19, 88.2, 88.21; 455/415; 382/115–127
See application file for complete search history.

(56) References Cited

U.S. PATENT DOCUMENTS

| | | | |
|---|---|---|---|
| 5,274,695 A * | 12/1993 | Green ..................... 379/88.02 |
| 5,502,759 A * | 3/1996 | Cheng et al. ............. 379/88.02 |
| 5,872,834 A | 2/1999 | Teitelbaum ............... 379/93.03 |
| 6,104,913 A * | 8/2000 | McAllister ................. 455/41.1 |
| 6,104,922 A | 8/2000 | Baumann .................... 455/410 |
| 6,219,793 B1 | 4/2001 | Li et al. ...................... 713/202 |
| 6,324,271 B1 * | 11/2001 | Sawyer et al. ........... 379/142.05 |
| 6,327,347 B1 * | 12/2001 | Gutzmann ............... 379/88.02 |
| 6,377,699 B1 | 4/2002 | Musgrave et al. ........... 382/117 |
| 6,424,249 B1 | 7/2002 | Houvener .................. 340/5.82 |
| 6,539,101 B1 | 3/2003 | Black .......................... 382/124 |
| 6,695,206 B2 * | 2/2004 | Ross .......................... 235/380 |
| 6,836,556 B1 * | 12/2004 | Bromba et al. ............. 382/124 |
| 6,993,118 B2 * | 1/2006 | Antonucci et al. ............ 379/45 |
| 2003/0044050 A1 * | 3/2003 | Clark et al. ................. 382/115 |
| 2003/0061233 A1 * | 3/2003 | Manasse et al. .......... 707/104.1 |
| 2003/0163739 A1 * | 8/2003 | Armington et al. .......... 713/202 |
| 2004/0133582 A1 * | 7/2004 | Howard et al. .............. 707/100 |
| 2004/0161079 A1 * | 8/2004 | Virzi et al. ............... 379/88.02 |
| 2004/0208302 A1 * | 10/2004 | Urban et al. .......... 379/142.17 |

* cited by examiner

*Primary Examiner*—Don Wong
*Assistant Examiner*—Marie Antoinette Cabucos

(57) ABSTRACT

Actual caller identification is provided. Biometric information is collected from a calling party. For example, retinal scan or facial recognition information is collected from a calling party. An element of a communications network receives the biometric information and uses the biometric information to determine the identity of the calling party. For instance, the biometric information is used to generate an index or key into an identity database. The index or key is used to retrieve identity information associated with a record including matching biometric information. The identity information is transmitted, for example, to user equipment of a called party.

27 Claims, 3 Drawing Sheets

NETWORK SUPPORT FOR CALLER IDENTIFICATION BASED ON BIOMETRIC MEASUREMENT

BACKGROUND

The present application is directed toward systems and methods for calling party identification in communications networks. The systems and methods will be described in terms of calling party identification within mobile telephone networks. However, the disclosed systems and methods can be applied to other networks, such as, for example, land line or wire based telephone networks or where calls are placed between wired phone networks and mobile phone networks.

Currently available calling party identification services are often referred to as "Caller ID". However, "Caller ID" is something of a misnomer. Instead of providing the identity of the calling party, currently available services provide information identifying the calling line being used by the calling party. Alternatively, the services or devices provide the called party with the name of the subscriber associated with the calling line. However, there is no assurance that the calling party is the subscriber. For example, the calling party may be a family member of the subscriber. Alternatively, a calling party may place a call from a borrowed phone or from a pay phone. In these instances, the calling party may be misidentified or not identified at all. Therefore, for example, the called party may inappropriately decide to not answer or otherwise screen a call based on the incorrect or nonexistent identification information.

Other instances where an identification associated with an actual calling party, is desirable, include, but are not limited to, small business and family applications, wherein, for example, one or more mobile phones are shared by a plurality of users. For instance, an administrative assistant may be able to anticipate the purpose of a call and retrieve an appropriate file before answering a call, if caller identification information correctly identifies which one of a plurality of possible company cell phone users is currently calling the desk of the assistant. In the household application, it may be anticipated that a call from a first child will be a request for transportation and is therefore, most appropriately answered by an older sibling or first parent, while a call identified as being from a second child may be anticipated as being related to a notification of an arrival time and therefore is appropriately answered by a second parent or perhaps the nearest family member to the phone.

For the foregoing reasons, there is a desire for methods and systems for providing true caller identification to a called party before the called party answers a call.

DESCRIPTION OF DRAWINGS

The invention may take form in various components and arrangements of components, and/or in various procedures and arrangements of procedures. The drawings are only for purposes of illustrating preferred embodiments. They are not to scale, and are not to be construed as limiting the invention.

SUMMARY

Figure 1:
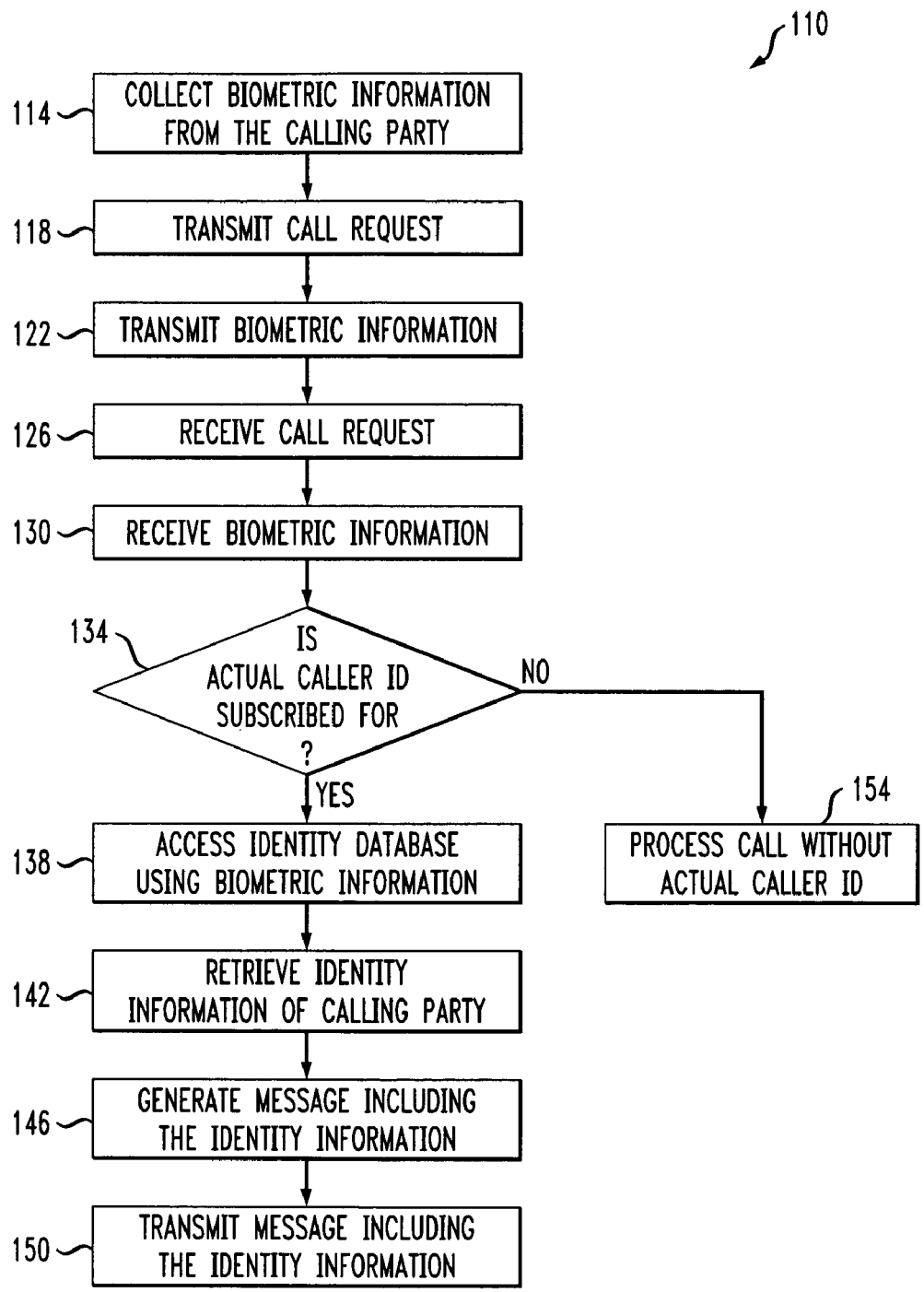
FIG. 1 is a flow chart outlining a method for identifying a calling party to a called party before the called party answers a call.

A method for identifying a calling party to a called party before the called party answers a call includes receiving an origination message, receiving biometric information regarding the calling party, using the biometric information to access an identity database record of the calling party, retrieving identity information regarding the calling party from the identity database and transmitting an MSC_Network Origination message including the identity information retrieved from the identity database.

In some embodiments the origination message includes the biometric information, therefore receiving the origination message includes receiving the biometric information.

Some embodiments include transmitting a request for the biometric information to user equipment of the calling party.

Receiving biometric information regarding the calling party can include receiving retinal scan data and/or receiving facial recognition data.

Using the biometric information to access an identity database record of the calling party can include extracting identifying parameters from the biometric information and using the extracted identifying parameters as a key or index into the identification database to access an identity database record of the calling party.

Some embodiments include determining that the called party subscribes to a biometric information based caller ID feature.

Some embodiments include receiving one or more spoken words and using information in the one or more spoken words in combination with the biometric information to access the identity database. Using information in the spoken name in combination with the biometric information to access the identity database can include converting the one or more spoken words into one or more text words and using the one or more text words and the biometric information as one or more keys or indexes into the identification database to access an identity database record of the calling party.

A system operative to identify a calling party to a called party before the called party answers a call includes an identity database accessible at least in part through the use of biometric data, the identity database including identifying records in association with respective biometric data, a switching center operative to receive biometric information regarding a calling party and use the received biometric information to access the identity database to retrieve identity information therefrom and to generate and transmit an MSC_Network Origination message including the identity information.

For example, the switching center can be operative to receive retinal scan information as the biometric data.

The system can include a piece of communications equipment (such as a phone) adapted to collect retinal scan information and transmit the retinal scan information to the switching center. The piece of communications equipment can be adapted to collect the retinal scan information from a user of the piece of communications equipment each time a call is to be placed and to transmit the retinal scan information as part of a Mobile Origination message. Alternatively, or additionally, the piece of communications equipment can be adapted to collect the retinal scan information from a user of the piece of communications equipment upon receiving a request for retinal scan information from the switching center.

The switching center can also be operative to receive facial image data as the biometric data. In that case, the system can include a piece of communications equipment adapted to collect and transmit facial image information to the switching center each time a call is to be placed and to transmit the facial image information as part of a Mobile Origination message. Additionally, or alternatively, the piece of communications equipment adapted to collect facial image information from a user of the piece of communications equipment upon receiving a request for facial image information from the switching center.

The switching center can be operative to receive raw biometric data and to parameterize the raw biometric data for use as a key or index into the identity database. Alternatively, or additionally, the switching center can be operative to receive parameterized biometric data from the piece of user equipment used by the calling party and to use the parameterized biometric data for as a key or index into the identity database.

Some embodiments include a system for identifying a calling party to a called party before the called party answers a call including means for receiving an origination message, means for receiving biometric information regarding the calling party, means for using the biometric information to access an identity database record of the calling party, means for retrieving identity information regarding the calling party from the identity database and means for transmitting an MSC_Network Origination message including the identity information retrieved from the identity database.

The means for receiving an origination message can include means for receiving an origination message including the biometric information, thereby including the means for receiving the biometric information.

The system can include means for transmitting a request for the biometric information to user equipment of the calling party.

The means for receiving biometric information regarding the calling party can include means for receiving retinal scan data and/or means for receiving facial recognition data.

The means for using the biometric information to access an identity database record of the calling party can include means for extracting identifying parameters from the biometric information and means for using the extracted identifying parameters as a key or index into the identification database to access an identity database record of the calling party.

Some embodiments include means for determining that the called party subscribes to a biometric information based caller ID feature.

Some embodiments include means for receiving one or more spoken words and means for using information in the one or more spoken words in combination with the biometric information to access the identity database. The means for using information in the spoken name in combination with the biometric information to access the identity database can include means for converting the one or more spoken words into one or more text words and means for using the one or more text words and the biometric information as one or more keys or indexes into the identification database to access an identity database record of the calling party.

DETAILED DESCRIPTION

A method 110 for providing caller identification information to a called party can include collecting 114 biometric information from the calling party, transmitting 118 a call request, transmitting 122 biometric information, receiving 126 the call request, and receiving 130 the biometric information. If receiving actual caller identification information before answering a call is not a universally available feature of telephone service, a determination 134 may be made as to whether one of the calling party or the called party subscribes to an actual caller identification service. If actual caller identification is subscribed for, an identity database is accessed 138 using the biometric information and an identity of the calling party is retrieved 142. The retrieved identity information is used to generate 146 a message including the identity information and the message is transmitted 150. If an actual caller ID feature is not subscribed for (and is not universally available) the call is processed 154 without providing the actual caller ID feature.

Collecting 114 biometric information from the calling party can include, for example, sensing a fingerprint of the calling party, recording an image of a retina of the calling party and/or taking a photograph of the face of the calling party. The biometric information 114 can be collected before the call request 118 is transmitted (e.g. before the caller presses a send button) or can be collected 114 at the request of a network element. In the former case, transmitting 118 the call request can include transmitting 122 the biometric information. In the latter case, the transmission of 122 the biometric information may occur separately from the transmission 118 of the call request.

The transmitted 118 call request and transmitted 122 biometric information are received 126, 130 in a network element. For example, the call request and biometric information are received 126, 130 in a switching center. If the call request includes the biometric information, the switching center interprets the call request to include a request to provide actual caller ID information to the called party.

If the determination 134 is made that the actual caller ID service is subscribed for (or if the service is universally available) the identity database is accessed 138 using biometric information. For example, where the number of possible identities is relatively small, or where available processor power or computation speed permit it, identity database access may include simply comparing the received 130 biometric information with each biometric information record stored in the identity database. For instance, correlation techniques are used to find matching data. Alternatively, the biometric data is parameterized before being used to access the identity database. Parameterization may be orchestrated by the network element, or may be performed by the user equipment of the calling party before the biometric information is transmitted 122 to the network element. However, it is anticipated that due to economies of scale and engineering considerations, it is more practical for the network element to orchestrate the parameterization of the biometric information.

Parameterization is a process by which the biometric information is analyzed and described in terms of a set of numbers or parameters. For instance, the parameterization of a fingerprint may include the counting of the number of swirls in the print, some measure of a lean of the swirls, and/or some measure of the circularity or distortedness of the swirls, etc. Retinal scan information may be parameterized by counting the number of large veins and the number of small veins and by measuring the relative spacing and direction of veins. A facial image may be parameterized by identifying facial features such as the eyes, the nose, the mouth, and the ears and measuring relative positions therebetween, such as, for example, an eye to eye distance, an eye to mouth distance, a mouth to nose distance, and an ear to ear distance.

The number and quality of the parameters used to describe the biometric information is preferably selected to uniquely identify each potential calling party. However, it is anticipated that in some instances, biometric information associated with two or more people may be parameterized to the same set of numerical values. Therefore, in addition to the biometric information, the network element may request additional information from the calling party. For example, the network element may request the name of the calling party. The calling party may enter their name through keypad entry or other means, such as, through verbal utterance. A voice to text converter may be used to convert an uttered name or other identifying phrase to text. It is anticipated that the combination of identifying phrase and biometric information should uniquely identify the calling party in almost all cases. Additionally, in systems where the length of time required to find a match is a function of the number of database entries that must be examined, the phrase or name utterance may be used to vastly reduce the number of database entries that must be searched.

Once the identity database is accessed and an entry in the database is located that matches the biometric information, or the biometric information in combination with the additional information, identifying information associated with the matching record is retrieved 142. For example, a name or other identifier of the calling party is retrieved 142. The retrieved 142 identity information is then used to generate 146 a message, such as, for example an MSC_Network Origination Message. For instance, the retrieved 142 identity information is included in a caller ID field of the MSC_Network Origination Message. The generated 146 message is then sent or transmitted 150 toward user equipment of the called party over a network. The identity of the calling party is thereby displayed or otherwise provided to the called party before the called party answers the call.

The retrieved 142 identity information may alternatively or additionally include a directory number of the calling party and/or a photograph of the calling party. The directory number and/or the photograph may also be included in one or more generated 146 messages, thereby identifying the calling party to the called party before the called party answers the call.

If for any reason a match is not found between the received biometric information 130 and the records accessed 138 in the identity database, call processing may continue as provided for in the prior art.

Figure 2:
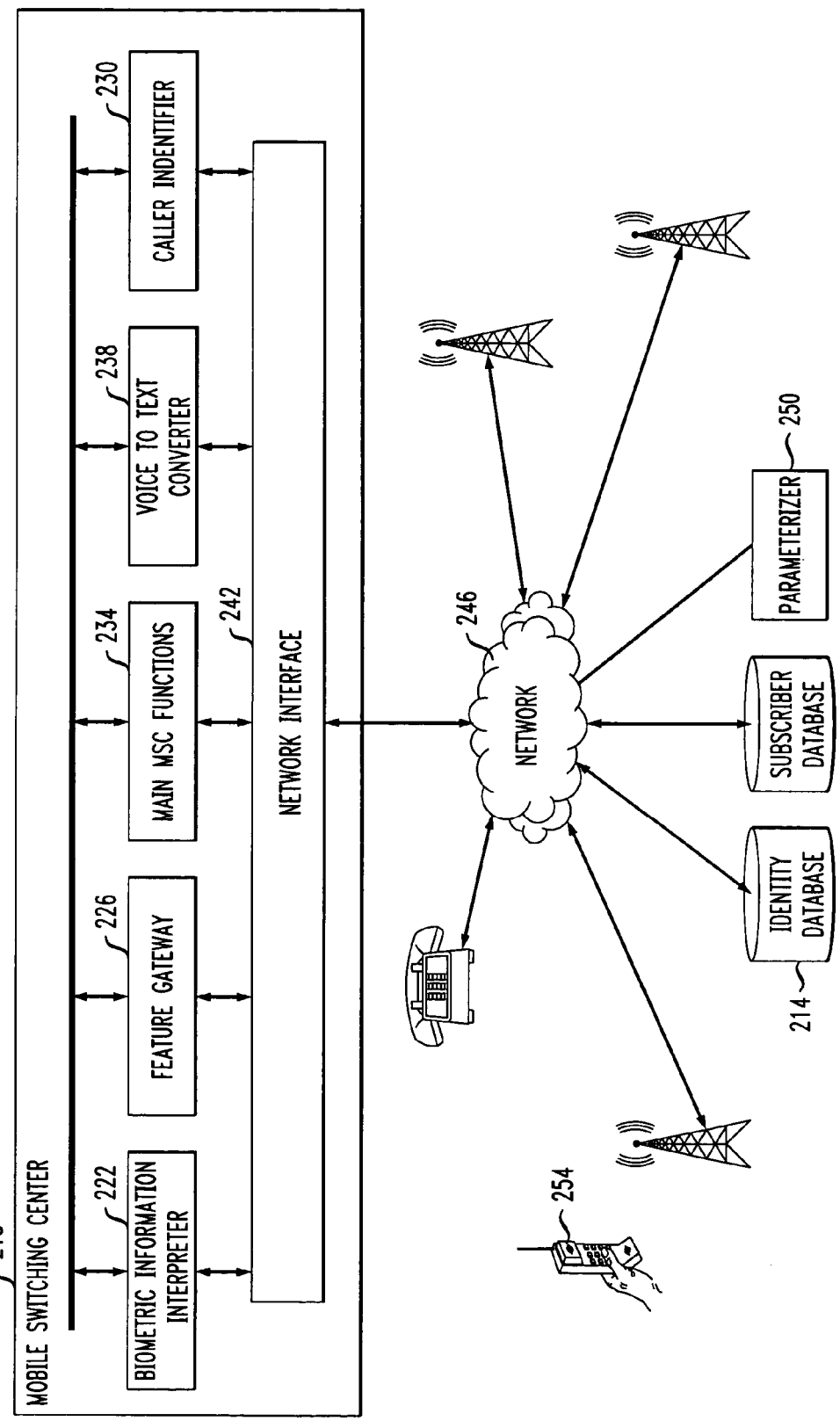
FIG. 2 is a block diagram of a system operative to identify a calling party to a called party before the called party answers a call.

Referring to FIG. 2, a system 210 operative to identify a calling party to a called party before the called party answers a call includes an identity database 214 and a switching center 218. The identity database 214 includes identifying records in association with respective biometric data. The database 214 is accessed 138, at least in part, through the use of biometric data. The switching center 218 is operative to receive 130 biometric information regarding a calling party and to use the received 130 biometric information to access the identity database 214 in order to retrieve 142 identity information from the database. The switching center 218 then uses the retrieved 142 identity information to generate 146 a message, such as an MSC_Network Origination Message including the identity information. The switching center 218 then transmits 150 the MSC_Network Origination Message to user equipment of the called party or to a serving switching center thereof, thereby providing identification information regarding the calling party to the called party before the called party answers a requested call.

For example, the Mobile Switching Center 218 includes a Biometric Information Interpreter 222, a Feature Gateway 226 and a Caller Identifier 230. Additionally, the Mobile Switching Center (MSC) 218 includes Main MSC Functions 234 associated with call termination and tear down and other functions known in the art. Optionally, the MSC 218 includes a Voice to Text Converter 238. The Biometric Information Interpreter 222 Feature Gateway 226, Caller Identifier 230, Main MSC Functions 234 and the Voice to Text Converter 238 communicate with devices external to the Mobile Switching Center 218 through the services of a Network Interface 242 which connects them 222, 226, 230, 234, 238 to the external devices over a network 246.

If the Main MSC Functions 234 receive 126 a call request including information foreign to the Main MSC Functions 234, the Biometric Information Interpreter 222 is notified. The Biometric Information Interpreter 222 examines the information that was foreign to the Main MSC Functions 234 to determine if the information is biometric information. For instance, the Biometric Information Interpreter 222 determines if the foreign information is fingerprint information, retinal scan information, and/or a facial image. Additionally, the Biometric Information Interpreter 222 determines whether the foreign information is raw biometric information or parametized biometric information. If the foreign information is biometric information, the Feature Gateway 226 is notified. The Feature Gateway 226 then determines 134 if the called party is entitled to receive Actual Caller ID information. The Feature Gateway 226 determines 134 if the Actual Caller ID feature is subscribed for. If the Actual Caller ID feature is not subscribed for, processing of the call is returned to the Main MSC Functions 234 and the call is processed 154 without the Actual Caller ID feature. If the Actual Caller ID feature is subscribed for, or if the feature is universally available, processing is passed to the Caller Identifier 230.

The Caller Identifier 230 uses the biometric information, which is provided to the Caller Identifier 230 by the Biometric Information Interpreter 222, to access 138 information in the Identity Database 214. For example, if the biometric information is raw and the identity database can accept and process queries including raw biometric data, then the Caller Identifier 230 generates such a query and transmits it to the Identity Database 214. The Identity Database 214 then compares the raw biometric information to raw biometric information stored in records of the database. When a matching record is found, the Identity Database 214 transmits identity information associated with the matching record to the Caller Identifier 230.

If the Identity Database 214 is too large, for such a search to be practical, the Caller Identifier 230 may request that the Feature Gateway 226 ask the calling party to state an identifying phrase such as, for example, his or her name or a password. When the calling party provides the requested utterance, the Feature Gateway 226 passes a recording of the utterance to the Caller Identifier 230. The Caller Identifier 230 passes the utterance to the Voice to Text Converter 238. The Voice to Text Converter 238 applies voice recognition algorithms to the utterance and provides the Caller Identifier 230 with a text (or ASCII code) version of the utterance. The Caller Identifier 230 includes the text version of the utterance in the query. The Identity Database 214 then limits the raw biometric data comparison to only those records associated with the same text string. Again, when a match is found, identifying information associated with the matching record is transmitted by the Identity Database 214 to the Caller Identifier 230.

Alternatively, if the records of the Identity Database 214 are associated with parameterized biometric data and the biometric information received from the Biometric Information Interpreter 222 is raw biometric information, the Caller Identifier 230 orchestrates the parameterization of the biometric information. For example, the Caller Identifier 230 transmits the raw biometric information to a Parameterizer 250. The Parameterizer 250 analyzes the raw biometric data and generates a set of numbers describing information contained within the raw biometric data. For example, as explained above, where the raw biometric information is a fingerprint, the Parameterizer 250 may generate a swirl count, a swirl direction or angle, and/or series or vectors describing the ridges and valleys of the print. Where the raw biometric data is a retinal scan, the Parameterizer 250 generates a similar set of numbers describing relative locations, curvatures, and shapes or routes of veins in the retina of the caller. Where the raw biometric information is a facial image, the Parameterizer 250 performs facial recognition techniques on the image, locates facial features and determines relative locations and measurements of the facial features. These measurements are the parameterization of the facial image data. The Parameterizer 250 passes the parameterized biometric data back to the Caller Identifier 230. The Caller Identifier 230 includes the parameterized data in the database query which is transmitted to the Identity Database 214. The Identity Database 214 uses the parameterized data as a key or index to find a record associated with matching biometric parameters. Identity information from the matching record is passed to the Caller Identifier 230.

The Caller Identifier 230 passes the identity information to the Main MSC Functions 234 which use the information to generate 146 a message including the identity information received from the Identity Database 214. For example, the Main MSC Functions 234 Generate 146 an MSC_Network Origination Message. The generated 146 message is transmitted 150 over the Network 246 toward the User Equipment 254 of the called party where it is displayed or otherwise provided to the called party before the called party answers the call. The identifying information can be a simple text string including a name of the calling party and/or a photograph of the calling party. The photograph can be a photograph retrieved from the Identity Database 214 or, where the biometric information received is a raw facial image, the raw facial image may be transmitted to the User Equipment 254 of the called party.

In other scenarios, the received 126 call request might not include biometric data. In such embodiments, the Feature Gateway 226 makes the determination 134 as to whether the Actual Caller ID feature is subscribed for. For every call request received 126 by the Mobile Switching Center 218. If the Actual Caller ID feature is subscribed for, the Feature Gateway 226 requests that the calling party provide biometric information. If biometric information is not provided, the call is processed 154 without providing Actual Caller ID information. If biometric information is provided, it is passed to the Biometric Information Interpreter 222 and processing proceeds as described above.

Figure 3:
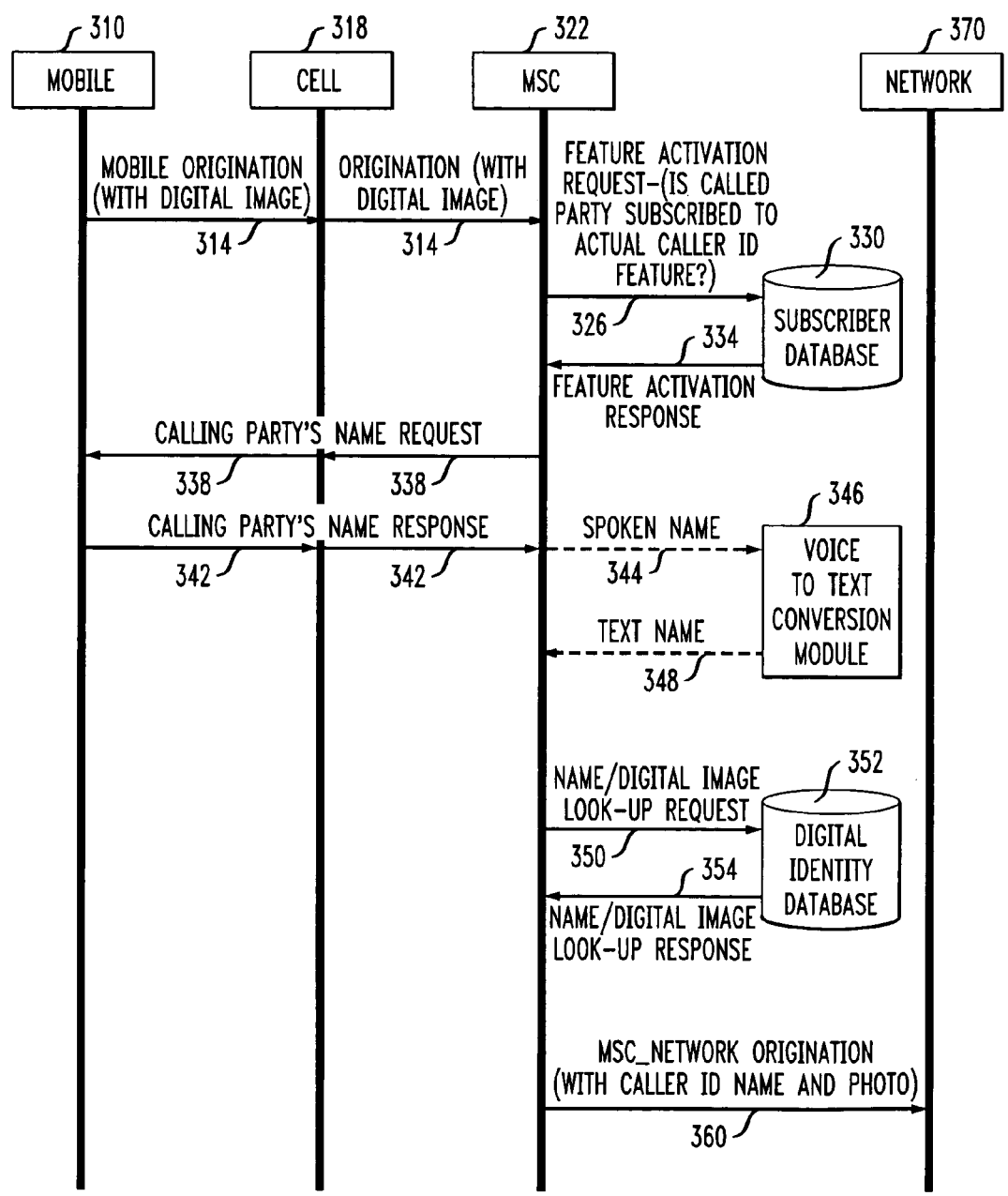
FIG. 3 is a call flow diagram outlining a call processing scenario wherein a calling party is identified to a called party before the called party answers a call.

Referring to FIG. 3, in an exemplary embodiment/scenario, a calling party uses Mobile User Equipment 310 to place a call. As part of the call placing procedure, a biometric image is captured. For example, the mobile device includes a camera and a facial image is captured. Alternatively, the Mobile User Equipment 310 includes a retinal scanner and an image of the user's retina is captured. In yet a third instance, the Mobile User Equipment 310 includes a fingerprint sensor and an image or similar representation of a fingerprint of the caller is captured. Once the biometric information is collected 114, a call request or Mobile Origination Message 314 is transmitted 118. The mobile origination message includes the collected 114 Biometric Information in the form of a digital image. Therefore, the biometric information is also transmitted 122. A Cell Site 318 relays the origination message 314 to a Mobile Switching Center 322. The Mobile Switching Center 322 receives 126, 130 the call request and biometric information and recognizes the call request as one that could be associated with the provision of actual caller identification information. The Mobile Switching Center 322 queries 326, a Subscriber Database 330 in order to determine if the called party subscribes to an Actual Caller ID feature. The Subscriber Database 330 provides 334 the Mobile Switching Center 322 with the state of an Actual Caller ID feature activation bit. The bit indicates that the called party does subscribe to the Actual Caller ID feature. Since the feature is subscribed for, the Mobile Switching Center requests additional information in order to limit the number of records that must be searched in a raw data comparison search. For example, the Mobile Switching Center 322 sends an utterance request message to the user equipment 310 of the calling party. For example, the utterance request message 338 is a request for the calling party to utter his or her name. The uttered name is transmitted as an utterance response 342 to the Mobile Switching Center 322. The Mobile Switching Center transmits the spoken name 344 to a Voice to Text Conversion module 346. The Voice to Text Conversion module 346 transmits a text version 348 of the spoken name 344 to the Mobile Switching Center 322. The Mobile Switching Center 322 includes the text version of the name and the digital image received 130 with the received 126 call request in the database query 350 transmitted to an Identity Database 352. The Identity Database 352 finds a matching record and transmits identity information 354 to the Mobile Switching Center 322. For example, the identity information 354 is a name, digital image and/or directory number of the calling party. The Mobile Switching Center 322 then generates an MSC_Network Origination Message 360 and transmits it toward user equipment (not shown) of the called party over a network 370.

The invention has been described with reference to the preferred embodiments. Obviously, modifications and alterations will occur to others upon a reading and understanding of this specification. It is intended that the invention be construed as including all such modifications and alterations insofar as they come within the scope of the appended claims or the equivalents thereof.

We claim:

1. A method for identifying a calling party to a called party before the called party answers a call, the method comprising:
   receiving an origination message;
   receiving biometric information regarding the calling party;
   using the biometric information to access an identity database record of the calling party;
   retrieving identity information regarding the calling party from the identity database record; and
   transmitting an MSC_Network Origination message including the identity information retrieved from the identity database record.

2. The method of claim 1 wherein receiving an origination message comprises:
   receiving an origination message including the biometric information, thereby receiving the biometric information.

3. The method of claim 1 further comprising:
   transmitting a request for the biometric information to user equipment of the calling party.

4. The method of claim 1 wherein receiving biometric information regarding the calling party comprises:
   receiving retinal scan data.

5. The method of claim 1 wherein receiving biometric information regarding the calling party comprises:
   receiving facial recognition data.

6. The method of claim 1 wherein using the biometric information to access an identity database record of the calling party comprises:
  extracting identifying parameters from the biometric information; and
  using the extracted identifying parameters as a key or index into the identification database to access an identity database record of the calling party.

7. The method of claim 1 further comprising:
  determining that the called party subscribes to a biometric information based caller ID feature.

8. The method of claim 1 further comprising:
  receiving one or more spoken words; and
  using information in the one or more spoken words in combination with the biometric information to access the identity database.

9. The method of claim 8 wherein using information in the one or more spoken words in combination with the biometric information to access the identity database comprises:
  converting the one or more spoken words into one or more text words; and
  using the one or more text words and the biometric information as one or more keys or indexes into the identification database to access the identity database record of the calling party.

10. A system operative to identify a calling party to a called party before the called party answers a call, the system comprising:
  an identity database accessible at least in part through the use of biometric data, the identity database including identifying records in association with respective biometric data;
  a switching center operative to receive biometric information regarding a calling party and use the received biometric information to access the identity database to retrieve identity information therefrom and to generate and transmit an MSC_Network Origination message including the identity information.

11. The system of claim 10 wherein the switching center is operative to receive retinal scan information as the biometric data.

12. The system of claim 11 further comprising:
  a piece of communications equipment adapted to collect retinal scan information and transmit the retinal scan information to the switching center.

13. The system of claim 12 wherein the piece of communications equipment is adapted to collect the retinal scan information from a user of the piece of communications equipment each time a call is to be placed and to transmit the retinal scan information as part of a Mobile Origination message.

14. The system of claim 12 wherein the piece of communications equipment is adapted to collect the retinal scan information from a user of the piece of communications equipment upon receiving a request for retinal scan information from the switching center.

15. The system of claim 10 wherein the switching center is operative to receive facial image data as the biometric data and wherein the system further comprises:
  a piece of communications equipment adapted to collect and transmit facial image information to the switching center each time a call is to be placed and to transmit the facial image information as part of a Mobile Origination message.

16. The system of claim 10 wherein the switching center is operative to receive facial image data as the biometric information and wherein the system further comprises:
  a piece of communications equipment adapted to collect facial image information from a user of the piece of communications equipment upon receiving a request for facial image information from the switching center.

17. The system of claim 10 wherein the switching center is operative to receive raw biometric data and to parameterize the raw biometric data for use as a key or index into the identity database.

18. The system of claim 10 wherein the switching center is operative to receive parameterized biometric data from a piece of user equipment used by the calling party and to use the parameterized biometric data as a key or index into the identity database.

19. A system for identifying a calling party to a called party before the called party answers a call, the system comprising:
  means for receiving an origination message;
  means for receiving biometric information regarding the calling party;
  means for using the biometric information to access an identity database record of the calling party;
  means for retrieving identity information regarding the calling party from the identity database record; and
  means for transmitting an MSC_Network Origination message including the identity information retrieved from the identity database record.

20. The system of claim 19 wherein the means for receiving an origination message comprises:
  means for receiving an origination message including the biometric information, thereby including the means for receiving the biometric information.

21. The system of claim 19 further comprising:
  means for transmitting a request for the biometric information to user equipment of the calling party.

22. The system of claim 19 wherein the means for receiving biometric information regarding the calling party comprises:
  means for receiving retinal scan data.

23. The system of claim 19 wherein the means for receiving biometric information regarding the calling party comprises:
  means for receiving facial recognition data.

24. The system of claim 19 wherein the means for using the biometric information to access an identity database record of the calling party comprises:
  means for extracting identifying parameters from the biometric information; and
  means for using the extracted identifying parameters as a key or index into the identification database to access an identity database record of the calling party.

25. The system of claim 19 further comprising:
  means for determining that the called party subscribes to a biometric information based caller ID feature.

26. The system of claim 19 further comprising:
  means for receiving one or more spoken words; and
  means for using information in the one or more spoken words in combination with the biometric information to access the identity database.

27. The system of claim 26 wherein the means for using information in the spoken words in combination with the biometric information to access the identity database comprises:
  means for converting the one or more spoken words into one or more text words; and
  means for using the one or more text words and the biometric information as one or more keys or indexes into the identification database to access the identity database record of the calling party.

* * * * *